US010706190B2

(12) United States Patent
Kellmereit et al.

(10) Patent No.: US 10,706,190 B2
(45) Date of Patent: Jul. 7, 2020

(54) TRANSFER AND VISUALIZATION OF TIME STREAMS FOR FORECAST SIMULATION

(71) Applicant: SAP SE, Walldorf (DE)

(72) Inventors: Jan Kellmereit, Darmstadt (DE); Ralph Moessner, Pfinztal (DE)

(73) Assignee: SAP SE, Walldorf (DE)

( * ) Notice: Subject to any disclaimer, the term of this patent is extended or adjusted under 35 U.S.C. 154(b) by 607 days.

(21) Appl. No.: 15/597,365

(22) Filed: May 17, 2017

(65) Prior Publication Data

US 2018/0336296 A1    Nov. 22, 2018

(51) Int. Cl.
*G06F 30/20* (2020.01)
*G06Q 30/02* (2012.01)
*G06F 111/02* (2020.01)

(52) U.S. Cl.
CPC ......... *G06F 30/20* (2020.01); *G06Q 30/0202* (2013.01); *G06F 2111/02* (2020.01)

(58) Field of Classification Search
CPC ...................................................... G06F 30/20
USPC ............................................................ 703/21
See application file for complete search history.

(56) References Cited

U.S. PATENT DOCUMENTS

| | | | |
|---|---|---|---|
| 6,032,125 A | 2/2000 | Ando | |
| 7,080,026 B2 | 7/2006 | Singh et al. | |
| 7,239,984 B2 | 7/2007 | Moessner | |
| 8,099,320 B2 | 1/2012 | Li et al. | |
| 8,185,347 B2 | 5/2012 | Moessner et al. | |
| 8,341,007 B2 | 12/2012 | Moessner | |
| 8,954,361 B1 | 2/2015 | Phillips et al. | |
| 2003/0212590 A1 | 11/2003 | Klingler | |
| 2004/0103018 A1 | 5/2004 | Kim et al. | |
| 2010/0082497 A1 | 4/2010 | Biesemann et al. | |
| 2010/0153158 A1 | 6/2010 | Wex et al. | |
| 2012/0047079 A1 | 2/2012 | Biesemann et al. | |
| 2014/0039979 A1 | 2/2014 | Zhang et al. | |

FOREIGN PATENT DOCUMENTS

KR    2001/0016761 A    3/2001

OTHER PUBLICATIONS

"Forecasting and Demand Management", DS Blog; retrieved Mar. 15, 2017; 2 pages; http://www.demandsolutions.com/forecast-management-demand-planning-inventory-forecasting-software.html.
SAS for Demand-Driven Planning and Optimization; Solution Overview; retrieved Mar. 15, 2017; 4 pages; https://www.sas.com/content/dam/SAS/en_us/doc/overviewbrochure/sas-for-demand-driven-planning-optimization-107293.pdf.

*Primary Examiner* — Bijan Mapar
(74) *Attorney, Agent, or Firm* — Fish & Richardson P.C.

(57) ABSTRACT

Methods, systems, and computer-readable storage media for data transfer with a forecast model, the method being executed by one or more processors and including: receiving, by a server-side computing device and from a client-side proxy, a query including a plurality of item references associated to a new item, retrieving, by the server-side computing device, a plurality of data sets from a repository, each of the plurality of data sets including a respective time stream corresponding to a respective item reference, providing, by the server-side computing device, a result data set by aggregating the plurality of data sets, and transmitting, by the server-side computing device, the result data set to the client-side proxy, for forecasting a future time stream of the new item using the forecast model.

20 Claims, 7 Drawing Sheets

TRANSFER AND VISUALIZATION OF TIME STREAMS FOR FORECAST SIMULATION

BACKGROUND

Forecasting is useful in several contexts. In an example context, data planning can improve the balance between item demand and item supply. This task relies on computing accurate forecasts of future item consumption and production at any point in time, and at any level of granularity. The increasing number of new types of items and the increasing accessibility to different markets provide additional challenges to balancing item demand and item supply. Historic time streams of associated item demands can provide useful starting points for optimizing current forecast models. A common technical issue associated to forecasting is that historic time streams are requested and received through multiple calls between systems. For example, the number of calls can be proportional to the number of historic time streams, such that an increase in the number of historic time streams prolongs the processing time associated with a forecast, and otherwise inefficiently consumes computing resources.

SUMMARY

Implementations of the present disclosure include computer-implemented methods for transferring time streams for use with a set of reference products defined for a new product. In some implementations, actions include receiving, by a server-side computing device and from a client-side proxy, a query including a plurality of item references associated to a new item, retrieving, by the server-side computing device, a plurality of data sets from a repository, each of the plurality of data sets including a respective time stream corresponding to a respective item reference, providing, by the server-side computing device, a result data set by aggregating the plurality of data sets, and transmitting, by the server-side computing device, the result data set to the client-side proxy, for forecasting a future time stream of the new item using the forecast model. Other implementations of this aspect include corresponding systems, apparatus, and computer programs, configured to perform the actions of the methods, encoded on computer storage devices.

These and other implementations can each optionally include one or more of the following features: determining a number of time streams included in the result data is based on a result data set size and a time stream size; generating a visualization data set based on the number of time streams; processing two or more of the plurality of data sets to generate a processed data set, wherein generating the result data set includes aggregating the plurality of data sets and the processed data set; retrieving the plurality of data sets from the repository includes retrieving one by one each of the plurality of data sets based on a time stream size defined within the query; and displaying the future time stream of the new item to an end user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to data transfer for a forecast model to predict time streams of new items, the forecast model providing a definition of reference products for new products. More particularly, implementations of the present disclosure are directed to transferring aggregated time streams for reducing the time associated with transmission of data from a server-side computing device to a client-side proxy, and otherwise provide a more efficient use of computing resources than other techniques. Implementations can include actions of receiving, by a server-side computing device and from a client-side proxy, a query including a plurality of item references associated to a new item, retrieving, by the server-side computing device, a plurality of data sets from a repository, each of the plurality of data sets including a respective time stream corresponding to a respective item reference, providing, by the server-side computing device, a result data set by aggregating the plurality of data sets, and transmitting, by the server-side computing device, the result data set to the client-side proxy, for forecasting a future time stream of the new item using the forecast model.

Forecast models can utilize historic time streams in order to predict future behavior of similar items. Given that a time stream can change constantly, and can include large historical bases, transmission of historic time streams from a server-side computing device to a client-side proxy can be a resource-intensive process. As described in further detail herein, implementations of the present disclosure address this challenge. For example, in accordance with implementations of the present disclosure, in order to reduce the resource demand to transmit historic time streams from a server-side computing device to a client-side proxy, the historic time streams can be aggregated before transmission and the forecast model can be configured to process the aggregated historic time streams data.

Figure 1:
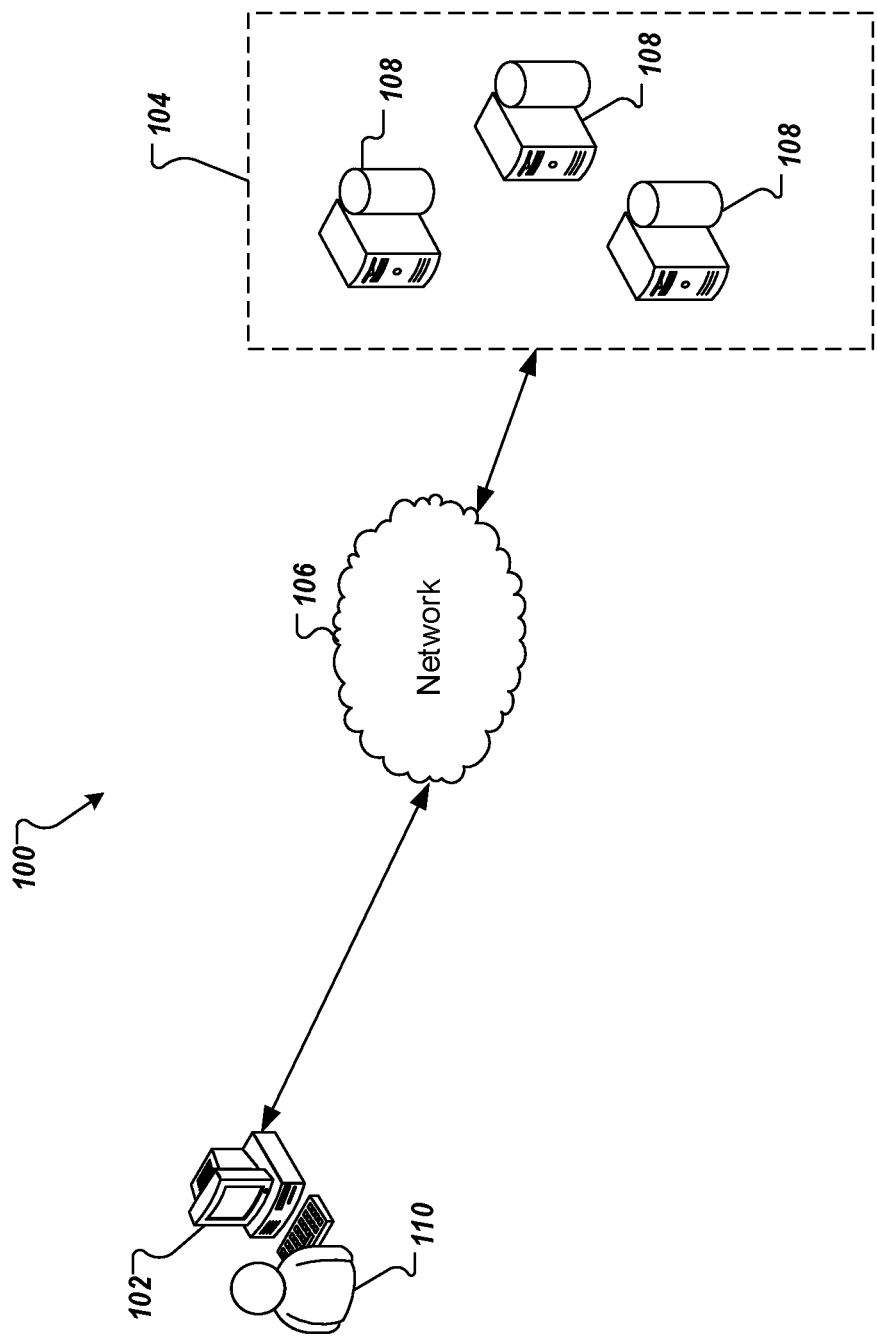
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store that stores historic time streams. In some implementations, and as described herein, the server system 104 can be provided by a third-party service provider, which stores and provides access to historic time streams. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a forecast service (e.g., provided as one or more computer-executable programs executed by one or more computing devices). For example, input data including multiple item references can be provided to the server system (e.g., from the client device 102), and the server system 104 can process the input data through the forecast service to provide result data. For example, the server system 104 can send the result data to the client device 102 over the network 106 for display to the user 110.

In some implementations, a database is part of a database system that also includes a query execution engine. In some examples, the query execution engine receives a query (e.g., a query including multiple item references), provides multiple historic time streams based on the query, aggregates the historic time streams to provide a result (e.g., aggregated the historic time streams from the database that are responsive to the query), and transmits the result to the client (e.g., from which the query was received).

In some implementations, the server system 104 hosts an analytical web application that a customer can access (e.g., using a thin client on a web browser executed by the computing device 102). In some examples, the analytical web application processes the time streams received from the database, processes them and aggregates the time streams into a single time stream, before sending the aggregated time stream to the client device 102.

As discussed in further detail herein, implementations of the present disclosure achieve example advantages. Data (e.g., time streams) collection and processing is designed for efficiency to minimize impact on the network and client device resources. In particular, implementations of the present disclosure optimize data transmission time. The transmission time is optimized by minimizing the number of calls between the client device 102 and the server system 104, independent of the number of requested time streams from the server system 104. Implementations of the present disclosure optimize data processing time and minimize the processing requirements of the client device 102. The processing time is optimized by performing a plurality of processing operations at server system 104, configured to have higher processing capabilities than the client device 102. In some implementations, only the server system 104 is modified to integrate implementations of the present disclosure including aggregation of time streams. For example, the application driver, such as a standard component of the server system 104 is replaced with a corresponding configuration that can perform the described operations. The web application can continue to query the database using its full functionality. The database, including its search algorithms to retrieve the time streams, is not modified. As described in further detail herein, implementations of the present disclosure function largely independently of the browser, and do not require any modification to the browser (e.g., no browser extension). Further, implementations of the present disclosure support more operations than a simple search, such as filtering, resampling, aggregations, and forecasting, which are typical for analytical applications. The present disclosure also provides the backend system with multiple time streams at a single point in time in order to calculate a final time stream from the single time streams, rather than performing single simulation calls for each time stream.

Figure 2A:
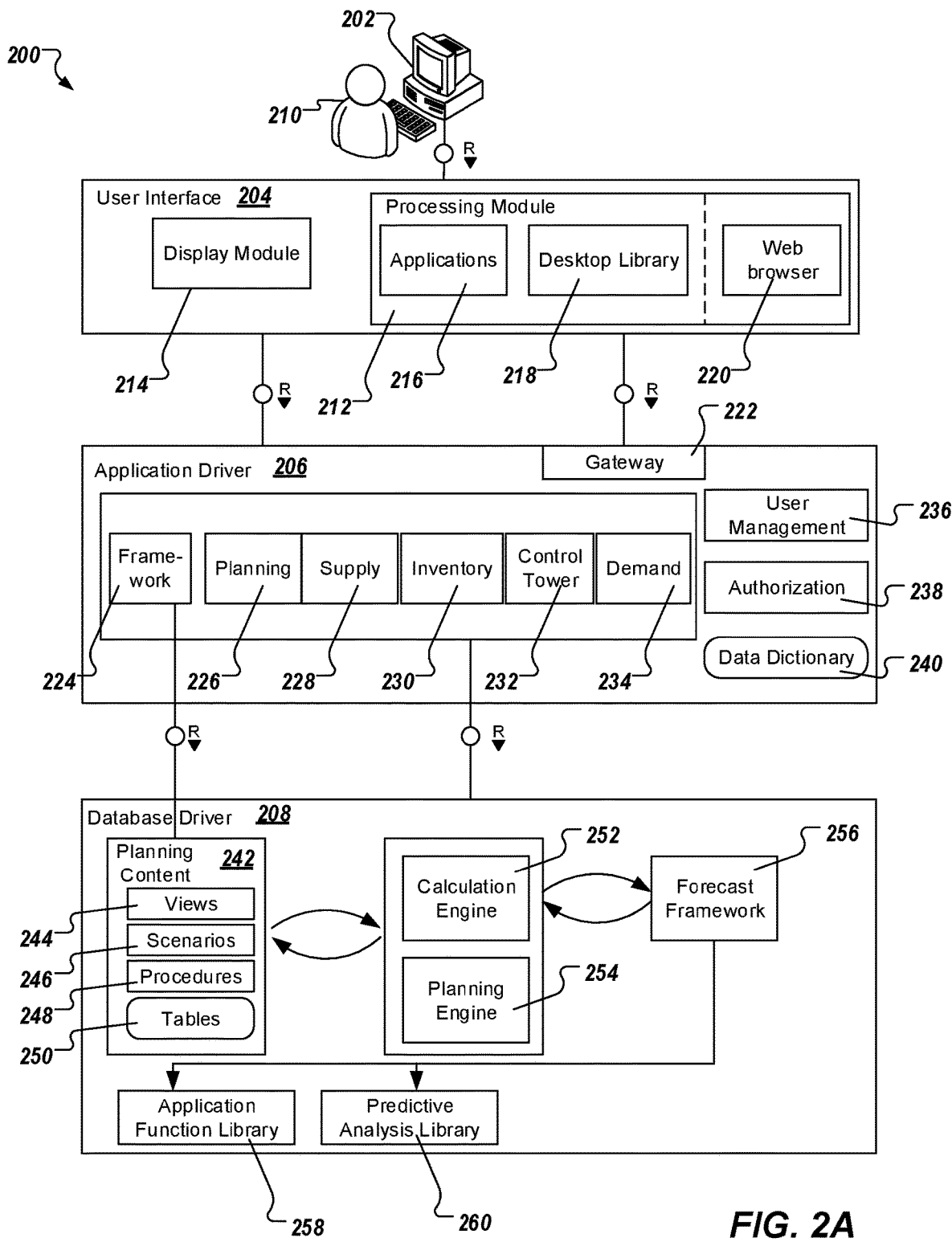
FIG. 2A depicts an example component architecture in accordance with implementations of the present disclosure.

FIG. 2A depicts an example component architecture 200 in accordance with implementations of the present disclosure. Components of the example architecture 200 include a client device 202, a user interface 204, an application driver 206, and a database driver 208. The user interface 204, the application driver 206 and the database driver 208 can be included in different servers. For example, the user interface 204 can be provided on an application server executed at the client-side. In some implementations, the user interface 204 is provided across multiple application servers at the client-side. The application driver 206 and the database driver 208 can be included in a back-end server-side.

The client device 202 can include a client-side computing device (and/or a user that uses the client-side computing device). The client device 202 can be configured to receive queries from a user 210 through the user interface 204. In the depicted example, the user interface 204 includes a processing module 212 and a display module 214. The processing module 212 can include an application module 216, a desktop library 218, and a browser 220. The processing module 212 can enable a user 210 to select an application (e.g., a forecasting algorithm). The desktop library can enable a user to select one or more functions or group of functions to be used with the selected application. The browser 220 can enable access to the processing module 212 through an internet web page. The processing module 212 can receives query messages to be sent to the application driver 206. The display module 214 can be configured to display query results received from the application driver 206. The display module 214 can include one or more applications configured to display charts and graphs. In some examples, the user interface 204 also includes a local database (not shown) for storing results returned from the application driver 206, and which supports post-processing, described in further detail herein. For example, the client device 202 provides one or more item references and requests (e.g., through HTTP requests) one or more time streams from the application driver 206 through the user interface 204. For example, the client device 202 can request tables and/or graphs, which are displayed in a (web) page of the application.

The application driver 206 includes a gateway 222, a framework 224, a planning module 226, a supply module 228, an inventory module 230, a control tower 232, a demand module 234, a user management module 236, an authorization module 238, and a data dictionary 240. The application driver 206 can be configured to process queries and query results. For example, the application driver 206 hosts an application (e.g., an analytical web application) that the client device 202 interacts with through the browser 220 using the gateway 222. More particularly, and in accordance with the present disclosure, the client device 202 interacts with the application driver 206 (and the application) through the user interface 204. The framework 224, the planning module 226, the supply module 228, the inventory module 230, the control tower 232, and the demand module 234 can be configured to process the queries received from the user interface 204 and the results to the queries received from the database driver 208 to forecast a time stream for an item and automatically execute actions associated to the forecasted time stream (e.g., generate a plan, manage a supply, and analyze an inventory). The user management module 236 and the authorization module 238 are auxiliary modules that enable a user to create and update a user profile and manage data associated to the user. The data dictionary 240 can provide the user 210 definitions of one or more terms used by the selected application and/or the modules of the application driver 206. The framework 224 can be configured to transmit the processed query (e.g., item references) to the database managed by the database driver 208.

The database driver 208 can include a planning content 242, a calculation engine 252, a planning engine 254, a forecast framework 256, an application function library 258, and a predictive analysis library 260. The database driver 208 can be configured to extract data (e.g., time streams) based on the processed query (e.g., item references). The database driver 208 can include a functionality that requires retrieving multiple time streams from the database maintained at the database server based on item references. In accordance with implementations of the present disclosure, the time streams retrieved by the database are sent back to the application driver 206 that is configured to aggregate the time streams before sending the results to the user interface 204.

The client device 202 can query the database managed by the database driver 208 through the application driver 206. For example, the client device 202 transmits a query to the user interface 204, which processes at least a portion of the query and transmits the query to the application driver 206.

In some implementations, the gateway 222 receives the query form the user interface 204 and provides the query to the framework 224 to be sent to the planning content 242 of the database driver 208. The planning content can communicate with the calculation engine 252 and the planning engine 254, which can communicate with the forecast framework 256. The forecast framework 256 can access the application function library and/or the predictive analysis library to retrieve the time streams one by one based on a format that matches the application selected through the user interface 204 and one or more parameters included in the query (e.g., length of time stream). The time streams are sent to the application driver 206, which is configured to aggregate the time streams and send the aggregated time stream to the user interface 204. The user interface 204 is configured to process the aggregated time stream and to display it using the display module 214.

Implementations of the present disclosure include the front-end server (including the client device 202 and the user interface 204) and the back-end server (including the application driver 206 and the database driver 208). Because the back end server is modified, implementations of the present disclosure target web application architectures that cleanly separate database queries from other application code and user interface. One such architecture includes the Fiori framework for web applications provided by SAP SE of Walldorf, Germany. In the Fiori framework, the web application is largely executed as JavaScript in the web browser. The user interface components (e.g., images) and design (as well as other resources) are downloaded as HTML and CSS integrated with the JavaScript code. In order to persistently store and process data on the cloud server, the client issues requests (e.g., OData requests), which are processed by a database engine (e.g., SAP S/4HANA, Ariba Mobile, and SAP Hybris Cloud for Customer provided by SAP SE of Walldorf, Germany). In some implementations, the requests are translated into queries (e.g., SQL queries) for the back-end database. The client can process the query responses and can display the query responses using dynamically created HTML.

In accordance with implementations of the present disclosure, the application driver 206 processes the query to extract data, such as item references, and aggregates the query result (e.g., multiple time streams). As described in further detail herein, implementations of the present disclosure support post-processing of the aggregated query result at the user interface 204. In some examples, the application driver 206 splits the query into multiple query parts: a first query part (e.g., which can include a first item reference) that can be sent to the database driver to retrieve a first time stream, and a second query part (e.g., which can include a second item reference) that can be sent to the database driver to retrieve a second time stream. The results to the first query part and second query part are aggregated before being sent to the user interface 204. The user interface 204 decomposes the aggregated result and processes the time streams with the selected application to generate and display a forecast result. The forecast result is sent to and displayed on the client device 202.

Implementations of the present disclosure are designed to increase the processing speed of a query. In particular, the components of the example architecture 200 have been configured to enable the transmission of multiple item references within a single query (e.g., OData request) from the front-end server (e.g., user interface 204) to the back-end server (e.g., application driver 206), perform at least a part of data processing (e.g., forecast simulation) at the back-end server (e.g., application driver 206) and receive a single response. In some examples, a portion of the processing operations (e.g., fragmentation of the result data and display of data) can then be executed by the front-end server (e.g., user interface 204) on the response. Using front-end post-processing, implementations of the present disclosure support the full functionality of SQL, and the application programmer can resort to a standard interface. Implementations of the present disclosure employ several different forecast and display applications that support different operations in SQL. This enables comparison between multiple time streams and a forecast result provided in the response.

Figure 3A:
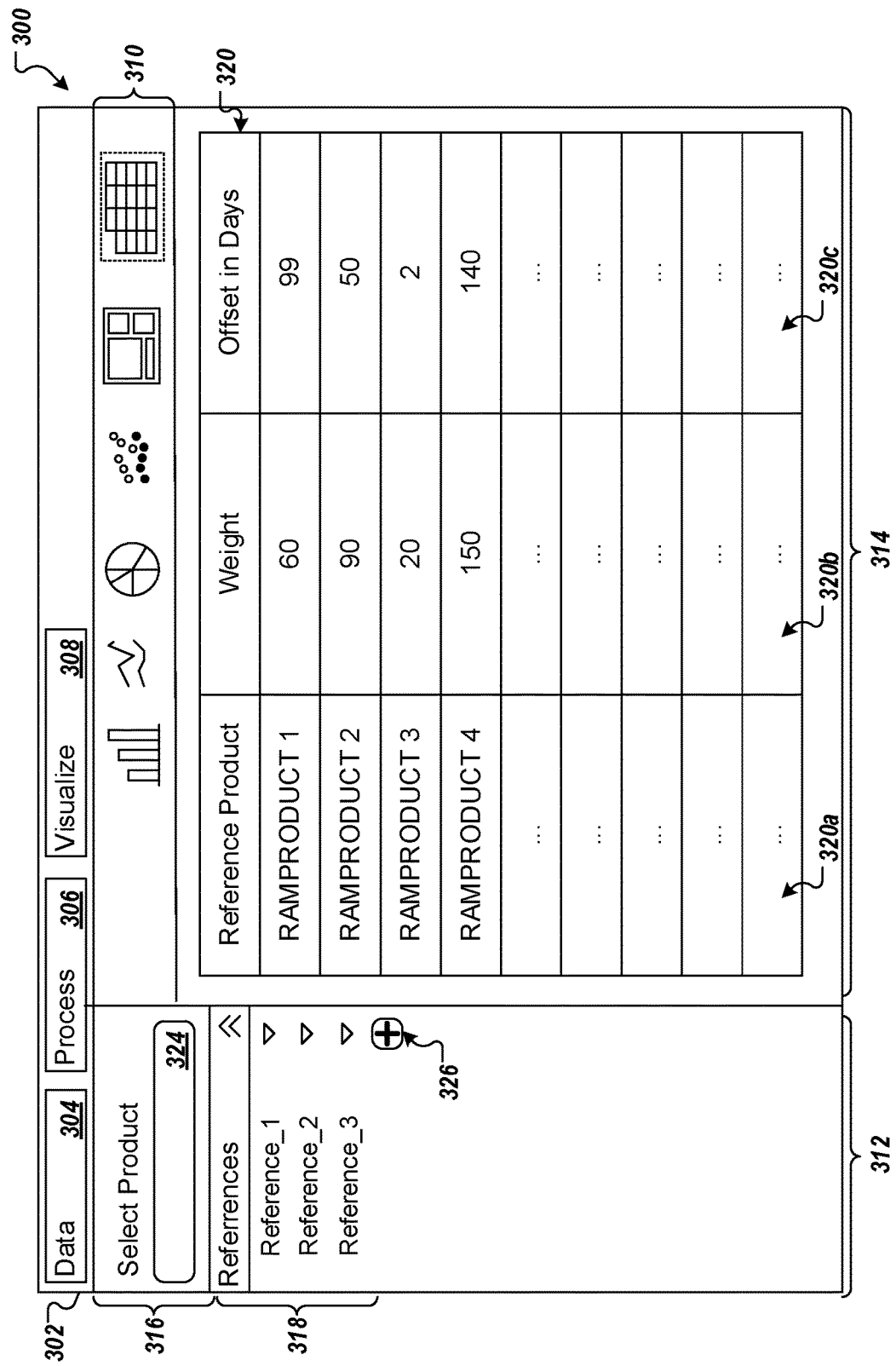
FIGS. 3A and 3B depict example graphical user interfaces in accordance with implementations of the present disclosure.
Figure 3B:
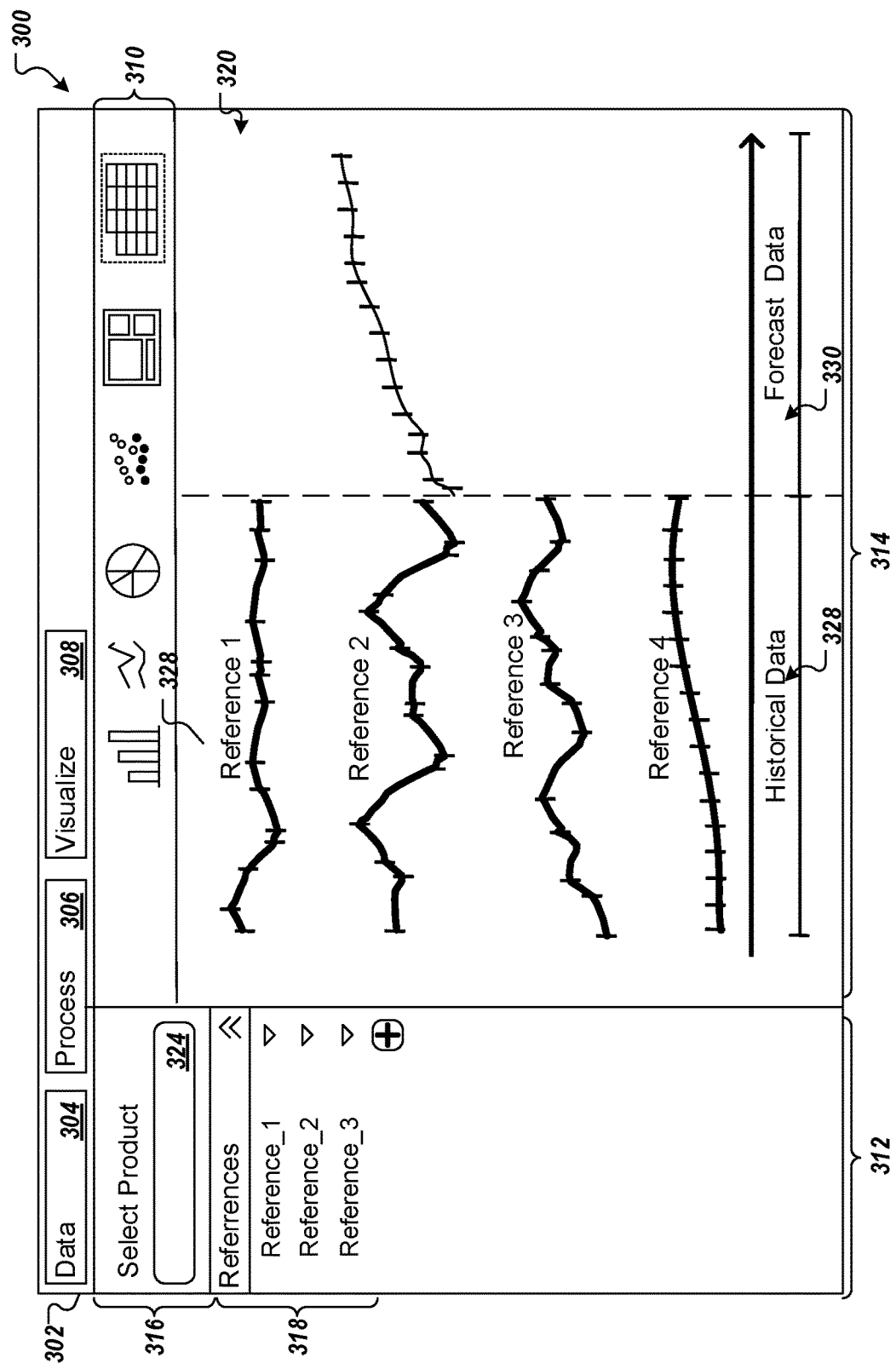

FIGS. 3A and 3B depict a portion of an example graphical user interface (GUI) 300 for displaying a table used for forecasting data associated to a new item. In some implementations, the GUI 300 can be the interface displayed by the computing device 102,202 with which the user 110, 210 is interacting, as described with reference to FIGS. 1 and 2, respectively.

The GUI 300 includes a number of choices presented in a menu bar 302, such as select data 304, process data 306 and visualize 308, a display menu 310, a visualization menu 312, and a display section 314. The visualization menu 312 can include an operation menu 316 and a reference menu 318. The display section 314 can include a table 320 created using the data menu 304 or the visualization menu 312. In the example illustrated in FIG. 3A, the table 320 is displayed with 3 columns 320a, 320b, and 320c.

The operation menu 316 includes an option to select an item. In some examples, the option to select the item includes a search box 324 that enables searching of item references that can be used in data forecast and visualizations. The reference menu 318 lists references of associated older items that have time streams available for visualization. The reference menu 318 enables a user to add rows by selecting the addition option 326 and to rearrange the order of the rows (e.g., based on relevance relative to the new item).

In the example depicted in FIG. 3A, the table 320 is illustrated as having a column 320a with the name of the referenced items, a column 320b for associated weights, and a column 320c for associated offset in days. In the example of FIG. 3B, the display section 314 includes a graphical visualization of historical data 328 and forecast data 330. The historical data 328 includes the time streams of the referenced items. The forecast data 330 includes a forecasted time stream associated with the new item.

Figure 4:
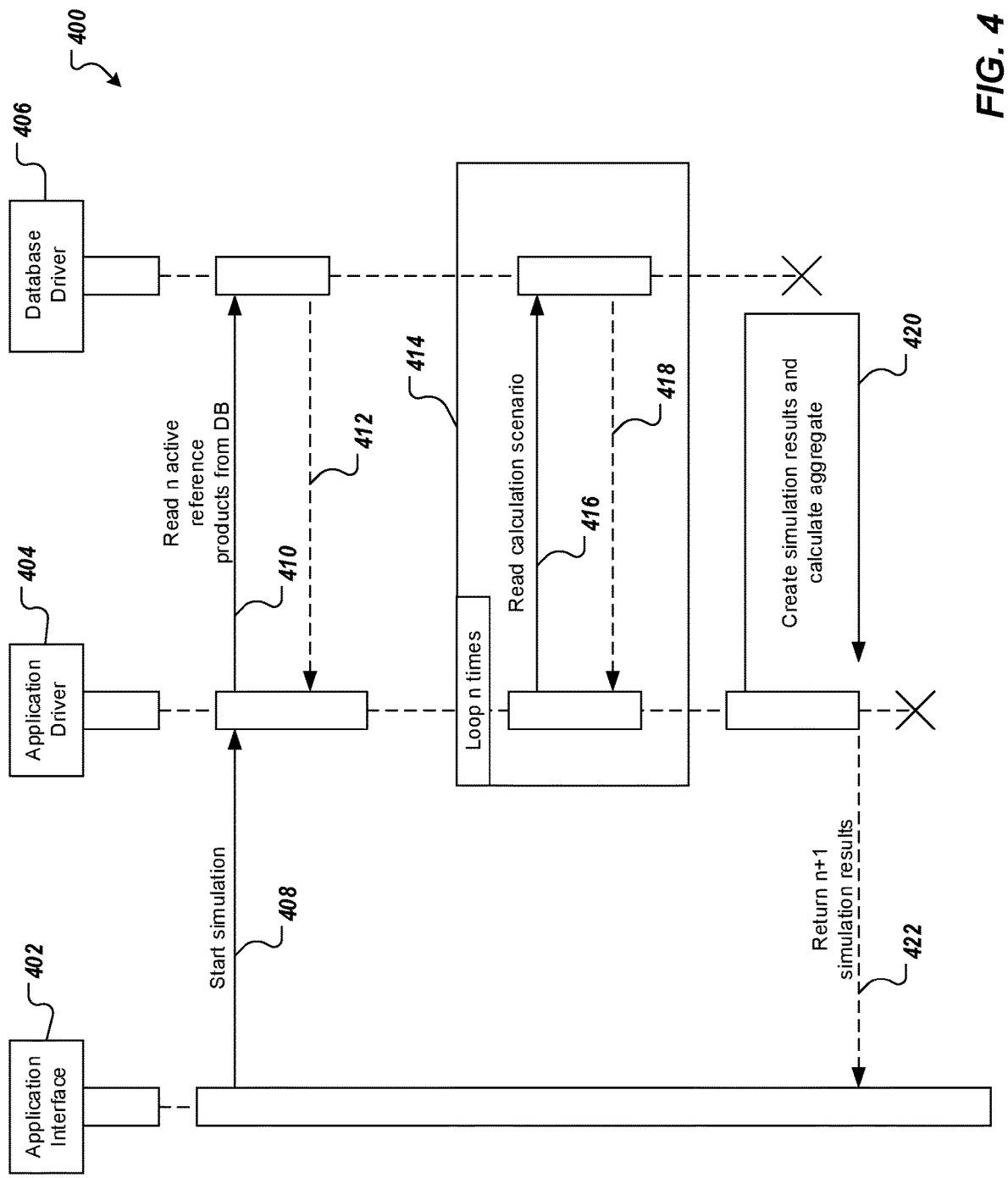
FIG. 4 depicts an example sequence diagram that can be executed in accordance with implementations of the present disclosure.

FIG. 4 depicts an example sequence diagram 400 that can be executed in accordance with implementations of the present disclosure. The example sequence diagram 400 includes operations performed by an application interface 402, an application driver 404, and a database driver 406. In some examples, the application interface 402 sends a query 408 to the application driver 404. The query 408 can include a request to start a simulation and n item references. The application driver 404 receives the query 408 and polls 410 the database driver 406 to read n active reference items from the database. The database driver 406 retrieves the time streams associated to each of the n active reference items and can send a confirmation 412 to the application driver 404 that the time streams are available.

The application driver 404 can perform a process 414 to read the time streams. For example, the application driver 404 can send a request 416 to read calculation scenarios from the database driver 406. For example, for each referenced item in the list on n items a time stream is requested according to one or more reading parameters. The reading parameters can include a time period defining a beginning and an end of the time stream, a frequency of the data within the time stream (e.g., a particular number of data points per hour, day, week, month, year or another user defined time interval). The application driver 404 sends the request 416 to read calculation scenarios multiple times (e.g., a number of times equal to n, the number of referenced items) to the database driver 406. After each received time stream 418 from the database driver 406, the application driver 404 determines whether all time streams were read (e.g., whether the request was sent less times than n, the number of referenced items). If it is determined that there are more time streams to be read the process 414 loops back. If the application driver 404 determines that there are no more time streams to be read, the application driver 404 determines aggregates the time streams and, optionally, generates the simulation results 420. The application driver 404 can provide the results including the aggregated time streams and simulation results 422 to the application interface 402.

Figure 5:
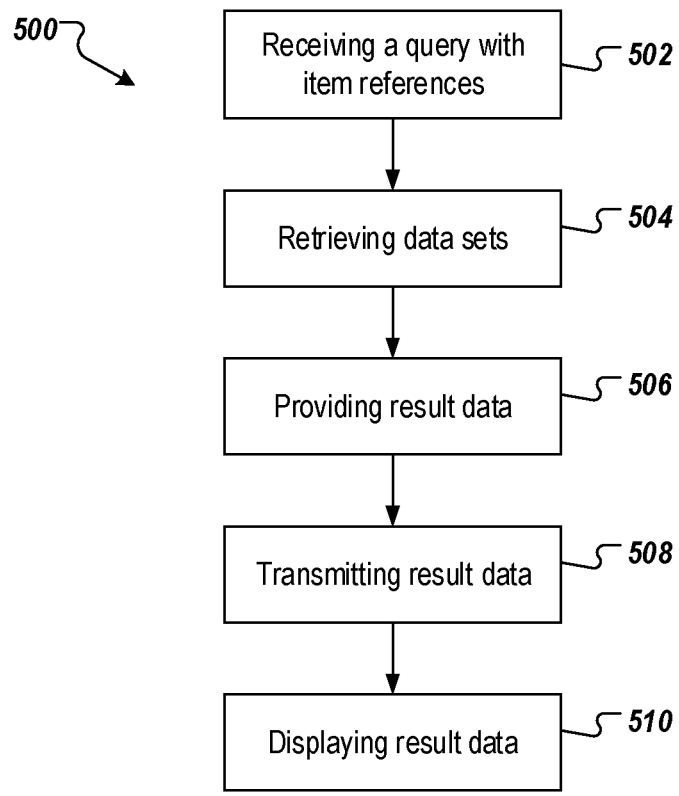
FIG. 5 depicts another example process that can be executed in accordance with implementations of the present disclosure.

FIG. 5 depicts an example process 500 that can be provided as one or more computer-executable programs executed using one or more computing devices, as described with reference to FIGS. 1-4. In some implementations, the example process 500 is executed to forecast a future time stream of the new item using the forecast model in accordance with implementations of the present disclosure.

A query is received by a server-side computing device from a client-side proxy (502). The query can include a plurality of item references associated to a new item. The item reference can include an identifier (e.g., a name or a code) of the item, a time interval associated with the item (e.g., a particular time interval from an event, such as time when being launched on the market), number of data samples per time interval, and a weight (e.g., a quantitative estimate of the correlation between the new item and the referenced item).

Within a context example, the new item can be the $n^{th}$ generation of a mobile device, for which a demand forecast is required to improve production scheduling, inventory management, logistics, and financial planning. The item references can include references to previous (n-i) generations of the mobile device and/or other devices including similar features as the new mobile device.

Multiple data sets are retrieved, by the server-side computing device from a repository (504). Each of the plurality of data sets includes a time stream corresponding to historical data of a referenced item. Within the context example, the time stream of a referenced item can include the number of items sold within a time interval (e.g., per day, week, month, or year).

A result data set is determined by the server-side computing device (506). The result data set is determined by processing and aggregating the plurality of data sets. The processing can include resampling the time streams such that all time streams have equal numbers of points correctly distributed over the time interval. Within the context example, the time streams of the referenced items can include different numbers of samples within the time interval, depending on the sampling frequency (e.g., per day, week, month, or year). In some implementations, resampling can include gap identification and correction. Within the context example, one or more of the time streams can miss data within the requested interval. Gapping correction can include an interpolation algorithm based on a function describing the time stream or other statistical methods.

The processing can include adding an offset to one or more of the time streams such that each time stream appears to be between the same start time and end time. Within the context example, one the time streams can correspond to a sale from 3-years ago and another time streams can correspond to a sale from 1.5-years ago. Adding an offset to the time streams can include determining the difference between the start times of the time streams and shifting, based on the difference, at least one of the time streams in times such that it appears that all historical data were collected simultaneously. In some implementations, the processing can include executing a forecasting algorithm. The forecasting model can include any statistical method configured to provide a baseline forecast, using as input the plurality of time streams relative to the associated weights. The forecasting model can be configured to determine one or more parameters (e.g., inventory, supply, demand, revenues, profit, etc.). Aggregating the plurality of data sets can include concatenating the time streams one after another to form a single data set including all historical data. In some implementations, the result data includes an aggregation of historical data and the forecast data.

The result data set is transmitted by the server-side computing device to the client-side proxy, such that all historical data are transmitted through a single call to the client-side proxy (508). The result data is displayed (510). Displaying the result data can include fragmenting the result data based on the number of referenced items and the number of data samples per time interval. In some implementations, the client-side proxy determines whether the number of samples within the result data divided by the number of data samples per time interval is an integer. In response to determining that result of the division is an integer, the data can be displayed as charts and/or graphs. In response to determining that result of the division is not an integer, an alert can be issued. In some implementations, the alert can trigger one or more post-processing operations to identify the time stream associated with the error (e.g., missing data) that triggered the alert. The post-processing operations can include removing the time stream associated with the error and displaying the remaining time streams.

Figure 6:
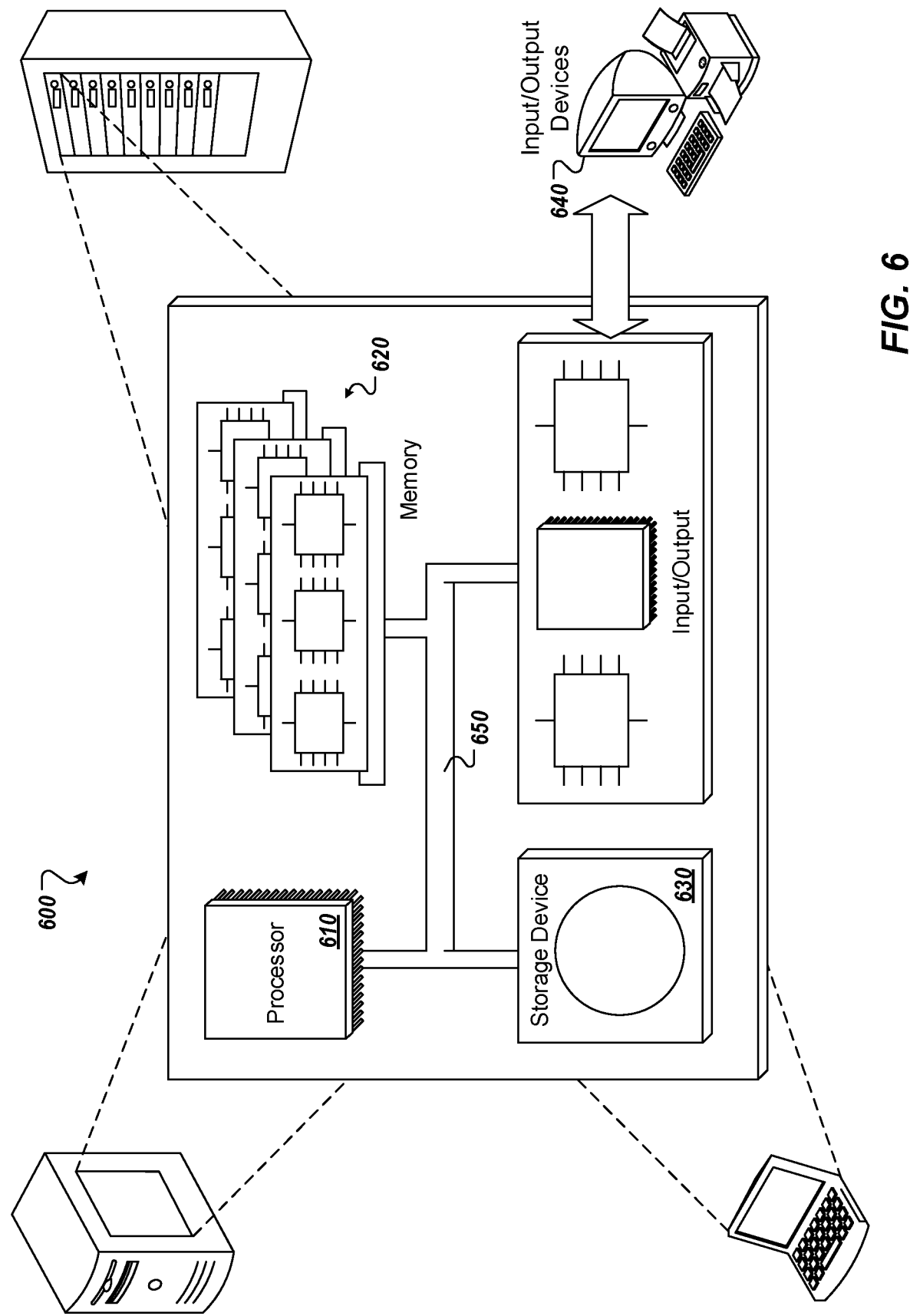
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program item tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for data transfer with a forecast model, the method being executed by one or more processors and comprising:
   receiving, by an application driver executed by a server-side computing device, a query comprising a plurality of item references associated to a new item, the query being received from a client-side proxy;
   providing, by the application driver, multiple query parts from the query;
   retrieving, by the application driver, a plurality of data sets from a repository, each of the plurality of data sets comprising a respective time stream corresponding to a respective item reference and a respective query part of the multiple query parts;
   providing, by the application driver, a result data set by aggregating the plurality of data sets; and
   transmitting, by the server-side computing device, the result data set to the client-side proxy, for forecasting a future time stream of the new item using the forecast model.

2. The method of claim 1, further comprising determining a number of time streams included in the result data is based on a result data set size and a time stream size.

3. The method of claim 2, further comprising generating a visualization data set based on the number of time streams.

4. The method of claim 1, further comprising processing two or more of the plurality of data sets to generate a processed data set.

5. The method of claim 4, wherein generating the result data set comprises aggregating the plurality of data sets and the processed data set.

6. The method of claim 1, wherein retrieving the plurality of data sets from the repository comprises retrieving one by one each of the plurality of data sets based on a time stream size defined within the query.

7. The method of claim 1, further comprising displaying the future time stream of the new item to an end user.

8. A non-transitory computer-readable storage medium coupled to one or more processors and having instructions stored thereon which, when executed by the one or more processors, cause the one or more processors to perform operations for transferring time streams for use with a forecast model, the operations comprising:
   receiving, by an application driver executed by a server-side computing device, a query comprising a plurality of item references associated to a new item, the query being received from a client-side proxy;
   providing, by the application driver, multiple query parts from the query;
   retrieving, by the application driver, a plurality of data sets from a repository, each of the plurality of data sets comprising a respective time stream corresponding to a respective item reference and a respective query part of the multiple query parts;
   providing, by the application driver, a result data set by aggregating the plurality of data sets; and
   transmitting, by the server-side computing device, the result data set to the client-side proxy, for forecasting a future time stream of the new item using the forecast model.

9. The non-transitory computer-readable storage medium of claim 8, further comprising determining a number of time streams included in the result data is based on a result data set size and a time stream size.

10. The non-transitory computer-readable storage medium of claim 9, further comprising generating a visualization data set based on the number of time streams.

11. The non-transitory computer-readable storage medium of claim 8, further comprising processing two or more of the plurality of data sets to generate a processed data set.

12. The non-transitory computer-readable storage medium of claim 11, wherein generating the result data set comprises aggregating the plurality of data sets and the processed data set.

13. The non-transitory computer-readable storage medium of claim 8, wherein retrieving the plurality of data sets from the repository comprises retrieving one by one each of the plurality of data sets based on a time stream size defined within the query.

14. The non-transitory computer-readable storage medium of claim 8, further comprising displaying the future time stream of the new item to an end user.

15. A system, comprising:
   a computing device; and
   a computer-readable storage device coupled to the computing device and having instructions stored thereon which, when executed by the computing device, cause the computing device to perform operations for transferring time streams for use with a forecast model, the operations comprising:
      receiving, by an application driver executed by a server-side computing device, a query comprising a plurality of item references associated to a new item, the query being received from a client-side proxy;
      providing, by the application driver, multiple query parts from the query;
      retrieving, by the application driver, a plurality of data sets from a repository, each of the plurality of data sets comprising a respective time stream corresponding to a respective item reference and a respective query part of the multiple query parts;
      providing, by the application driver, a result data set by aggregating the plurality of data sets; and
      transmitting, by the server-side computing device, the result data set to the client-side proxy, for forecasting a future time stream of the new item using the forecast model.

16. The system of claim 15, further comprising determining a number of time streams included in the result data is based on a result data set size and a time stream size.

17. The system of claim 16, further comprising generating a visualization data set based on the number of time streams.

18. The system of claim 15, further comprising processing two or more of the plurality of data sets to generate a processed data set.

19. The system of claim 18, wherein generating the result data set comprises aggregating the plurality of data sets and the processed data set.

20. The system of claim 15, wherein retrieving the plurality of data sets from the repository comprises retrieving one by one each of the plurality of data sets based on a time stream size defined within the query.

* * * * *